(12) United States Patent
Komatsu et al.

(10) Patent No.: US 8,201,421 B2
(45) Date of Patent: Jun. 19, 2012

(54) OPTICAL COMPONENT AND METHOD FOR ITS PRODUCTION

(75) Inventors: Takayuki Komatsu, Nagaoka (JP); Tsuyoshi Honma, Nagaoka (JP); Takumi Fujiwara, Sendai (JP); Yasuhiko Benino, Okayama (JP)

(73) Assignees: Asahi Glass Company, Limited, Toyko (JP); Nagaoka University of Technology, Nagaoka-shi (JP)

( * ) Notice: Subject to any disclaimer, the term of this patent is extended or adjusted under 35 U.S.C. 154(b) by 906 days.

(21) Appl. No.: 12/222,509

(22) Filed: Aug. 11, 2008

(65) Prior Publication Data

US 2008/0315123 A1 Dec. 25, 2008

Related U.S. Application Data

(63) Continuation of application No. PCT/JP2007/051731, filed on Feb. 1, 2007.

(30) Foreign Application Priority Data

Feb. 9, 2006 (JP) .................................. 2006-032470
Mar. 7, 2006 (JP) .................................. 2006-061479

(51) Int. Cl.
*C03B 37/022* (2006.01)
*C03B 37/10* (2006.01)
*C03B 27/012* (2006.01)

(52) U.S. Cl. ................. 65/392; 65/386; 65/111; 65/529; 65/33.1

(58) Field of Classification Search ................. 65/392, 65/386, 33.1
See application file for complete search history.

(56) References Cited

U.S. PATENT DOCUMENTS

| 3,464,806 | A | * | 9/1969 | Seki et al. ........................ 65/32.4 |
| 4,847,138 | A | * | 7/1989 | Boylan et al. .................. 428/209 |
| 6,154,593 | A | * | 11/2000 | Miura et al. .................. 385/123 |
| 6,573,026 | B1 | * | 6/2003 | Aitken et al. .................. 430/290 |
| 6,706,154 | B1 | * | 3/2004 | Yang et al. ............... 204/157.15 |
| 6,729,161 | B1 | * | 5/2004 | Miura et al. ..................... 65/390 |

(Continued)

FOREIGN PATENT DOCUMENTS

DE 43 06 004 A1 9/1993

(Continued)

OTHER PUBLICATIONS

English Language Translation of DE 43 06 004 A1. Machine lanugage transalation accesed via esp@cenet on Sep. 12, 2011.*
English Language Translation of JP 2003-098563. Machine lanugage transalation accesed via PAJ on Sep. 12, 2011.*

(Continued)

*Primary Examiner* — Jason L. Lazorcik
(74) *Attorney, Agent, or Firm* — Oblon, Spivak, McClelland, Maier & Neustadt, L.L.P.

(57) ABSTRACT

To obtain an optical component having excellent secondary optical nonlinear properties by irradiating a surface and/or inside of glass having at least one member selected from Ni, Fe, V, Cu, Cr and Mn as a heat source material for absorbing and converting a laser beam to heat, incorporated to a glass matrix comprising at least one glass-forming oxide-selected from $SiO_2$, $GeO_2$, $B_2O_3$, $P_2O_5$, $TeO_2$, $Ga_2O_3$, $V_2O_5$, $MoO_3$ and $WO_3$ and at least one member selected from alkali metals, alkaline earth metals, rare earth elements and transition elements, with a laser beam with a wavelength to be absorbed by the heat source material, to convert the irradiated portion to a single crystal or a group of crystal grains comprising components contained in the glass matrix and not containing the heat source material, thereby to form a pattern.

18 Claims, 9 Drawing Sheets

U.S. PATENT DOCUMENTS

| | | | |
|---|---|---|---|
| 6,796,148 B1 * | 9/2004 | Borrelli et al. | 65/386 |
| 6,977,137 B2 * | 12/2005 | Borrelli et al. | 430/321 |
| 7,951,632 B1 * | 5/2011 | Quick et al. | 438/46 |
| 2004/0003627 A1 * | 1/2004 | Hashima et al. | 65/33.2 |
| 2004/0198582 A1 * | 10/2004 | Borrelli et al. | 501/56 |

FOREIGN PATENT DOCUMENTS

| | | |
|---|---|---|
| JP | 11-71139 | 3/1999 |
| JP | 2000-95600 | 4/2000 |
| JP | 2001-235609 | 8/2001 |
| JP | 2002-154845 A | 5/2002 |
| JP | 2003-98563 | 4/2003 |
| JP | 2004-35317 | 2/2004 |
| JP | 2004-523917 | 8/2004 |
| JP | 2005-132693 | 5/2005 |
| WO | WO 97/01164 | 1/1997 |

OTHER PUBLICATIONS

Adelaine F. Maciente, et al., "Surface crystallization of $\beta$-BaB$_2$O$_4$ phase using a CO$_2$ laser source", Journal of Non-Crystalline Solids, vol. 306, 2002, pp. 309-312.

Tsuyoshi Honma, et al., "Technique for writing of nonlinear optical single-crystal lines in glass", Applied Physics Letters, vol. 83, No. 14, Oct. 6, 2003, pp. 2796-2798.

H. Jain, "Transparent Ferroelectric Glass-Ceramics", Ferroelectrics, vol. 306, 2004, pp. 111-127.

Tsuyoshi Honma, et al., "Transition metal atom heat processing for writing of crystal lines in glass", Applied Physics Letters, vol. 88, Jul. 2006, pp. 231105-1 to 231105-3.

Extended Supplementary European Search Report dated Nov. 23, 2010 in corresponding European Application No. 07 71 3759.

* cited by examiner (a)

(b)

(c)

(a)

(b)

OPTICAL COMPONENT AND METHOD FOR ITS PRODUCTION

TECHNICAL FIELD

The present invention relates to a technique which comprises irradiating a surface and/or inside of glass with a laser beam to crystallize the irradiated portion to form a pattern at the surface and/or inside of the glass.

BACKGROUND ART

While being glass, crystallized glass has secondary optical non-linear properties inherent to crystal, and thus, it has a wide transmitting wavelength region, and it can be easily connected to glass optical fiber. Thus, it is expected as a new photonics material for an optical integrated circuit or an optical switch for light wave control.

On the other hand, an optical component such as an integrated optical switch using a non-linear optical single crystal such as $LiNbO_3$ to utilize the secondary optical non-linear properties inherent to the crystal, has been proposed, but it is difficult to connect it to glass optical fiber. Besides, preparation of the crystal material is difficult, and the shape-forming property is also inferior to a glass material, whereby it is very difficult to process it into a desired shape.

Whereas, a glass material has a characteristic such that the shape can be controlled simply, easily and inexpensively, for example, in forming into a thin film or in drawing it into a fiber. However, it does not essentially have a structure having an electrical polarity aligned (oriented) in a specific direction as in the case of a crystal material, and in principle, glass does not show secondary optical non-linear properties. Accordingly, it has not heretofore been realized to use glass as an active light wave control functional material, as expected by crystal, for e.g. an optical switch, from the viewpoint of the degree of such secondary optical non-linear properties.

In or after 1990, a method for preparing crystallized glass by using pulsed laser was reported. For example, a method for producing crystallized glass was reported wherein microcrystals were selectively precipitated in the inside of a glass (Patent Documents 1 and 2). However, in such prior art, it was not possible to control the alignment of crystal particles, and it was not possible to sufficiently obtain secondary optical non-linear properties inherent to a crystal material.

As a method for preparing crystallized glass by utilizing heat by a laser, it is known to irradiate a glass surface with a $CO_2$ laser to induce crystallization at the glass surface (Non-Patent Document 1). Further, a method for preparing a crystallized optical waveguide by using a $CO_2$ laser has been reported by U.S. Corning (Patent Document 3). However, in the preparation of crystallized glass by using a $CO_2$ laser, the laser beam is absorbed only by the surface, whereby the crystallization is limited to the glass surface, and the inside can not be processed. Further, the wavelength is a long wavelength, whereby microregions can hardly be processed.

Further, a method for producing crystallized glass made of non-linear optical crystals has been reported which comprises irradiating a bismuth type glass containing samarium with a near infrared laser of a continuous oscillation type with a wavelength of 1,064 nm (Patent Document 4). This method utilizes a phenomenon such that an Nd:YAG laser beam excites transition between the energy levels corresponding to the infrared laser beam, of samarium atoms present in the glass (transition from the energy level of $^6H_{5/2}$ to the energy level of $^6F_{9/2}$), and the photoexcited electrons undergo relaxation without radiation (radiation-free relaxation), i.e. efficiently emit heat, so that local heating takes place around samarium atoms. In this connection, it has been proposed to prepare crystallized glass having orientation of crystals aligned by continuously moving the focal position of a laser beam which can be constantly oscillated (Non-Patent Document 2).

However, in the above-mentioned Patent Document 4, with a laser beam having a wavelength of 1,064 nm, crystallization will no develop unless the content of $Sm_2O_3$ is at least 3 mol %, when the irradiation power of the laser beam is 100 $W/cm^2$. Therefore, such a method was not applicable to a case of glass components whereby samarium can not be incorporated in a large amount to the glass or to a case of glass components whereby the temperature for precipitation of the desired group of crystal particles is high and the crystallization is difficult solely by the heat generation by the laser. Therefore, it is desired to incorporate ion species which are capable of converting the irradiated laser beam to heat efficiently with its content smaller than samarium, but there has been no report on such prior art.

Patent Document 1: JP-A-11-71139
Patent Document 2: JP-A-2005-132693
Patent Document 3: JP-A-2004-523917
Patent Document 4: JP-A-2003-98S63
Non-Patent Document 1: C. Mai, Supplement Riv. Staz. Sper. Vetro XXIII (1993) 435, Adelaine F. Maciente et al., Journal of Non-Crystalline Solids 306 (2002) 309-312
Non Patent Document 2: T. Honma et al., Applied Physics Letters, vol. 83, no. 14, pp. 2796-2798, 2003

DISCLOSURE OF THE INVENTION

Object to be Accomplished by the Invention

The present invention has been made under these circumstances and has an object to provide an optical component having a pattern formed by irradiating glass with a laser beam and crystallizing the irradiated portion, wherein the portion irradiated with the laser beam is crystallized more efficiently than ever and yet to be excellent in the crystallinity such as alignment, thereby to obtain an optical component excellent in secondary optical non-linear properties.

Means to Accomplish the Object

To accomplish the above object, the present invention provides the following optical component and a method for its production.

(1) A method for producing an optical component, which comprises irradiating a surface and/or inside of glass having at least one member selected from Ni, Fe, V, Cu, Cr and Mn as a heat source material for absorbing and converting a laser beam to heat, incorporated to a glass matrix comprising at least one glass-forming oxide selected from $SiO_2$, $GeO_2$, $B_2O_3$, $P_2O_5$, $TeO_2$, $Ga_2O_3$, $V_2O_5$, $MoO_3$ and $WO_3$ and at least one member selected from alkali metals, alkaline earth metals, rare earth elements and transition elements, with a laser beam with a wavelength to be absorbed by the heat source material, to convert the irradiated portion to a single crystal or a group of crystal grains comprising components contained in the glass matrix and not containing the heat source material, thereby to form a pattern.

(2) The method for producing an optical component according to the above (1), wherein prior to the irradiation with a laser beam, the glass is subjected to oxidation treatment or reduction treatment to form a light-absorbing layer having an absorption coefficient at a laser emission wavelength increased over a prescribed depth from the surface, and then, the laser beam is applied with its focal point adjusted to the surface or a prescribed depth in the light-absorbing layer.

(3) The method for producing an optical component according to the above (1), wherein prior to the irradiation with a laser beam, the glass is subjected to oxidation treatment or reduction treatment to form a light-absorbing layer having an absorption coefficient at a laser emission wavelength increased over a prescribed depth from the surface and then, in a case where the light-absorbing layer is formed by the reduction treatment, oxidation treatment is carried out or in a case where the light-absorbing layer is formed by the oxidation treatment, reduction treatment is carried out, so as to let the light-absorbing layer partly disappear at its glass surface side region, and then, the laser beam is applied with its focal point adjusted to a prescribed depth in the light-absorbing layer.

(4) The method for producing an optical component according to the above (2) or (3), wherein after the irradiation with a laser beam to form a pattern of the single crystal or the group of crystal grains, in a case where the light-absorbing layer is formed by the reduction treatment, oxidation treatment is carried out or in a case where the light-absorbing layer is formed by the oxidation treatment, reduction treatment is carried out, to let the light-absorbing layer disappear.

(5) The method for producing an optical component according to any one of the above (1) to (4), wherein the irradiated portion becomes at least one member selected from groups of crystals made of $Ba_2TiSi_2O_8$, $Ba_2TiGe_2O_8$, $BiBO_3$, $BaB_2O_4$, $(Sr,Ba)Nb_2O_6$, $LaBGeO_5$, $Nd_2(MoO_4)_3$, $Sm_2(MoO_4)_3$, $Gd_2(MoO_4)_3$, $LiBGeO_4$, $BaTiO_3$, $BaLiO_3$, $LiNbO_3$, $KNbO_3$ and solid solutions thereof.

(6) The method for producing an optical component according to the above (1) to (5), wherein an Nd:YAG laser is used for the irradiation.

(7) The method for producing an optical component according to the above (1) to (6), wherein the laser beam is continuously moved linearly at a moving speed of from 0.1 to 500 μm/s.

(8) The method for producing an optical component according to the above (1) to (7), wherein a single crystal or a group of aligned crystal grains is self-formed.

(9) An optical component which is made of glass having at least one member selected from Ni, Fe, V, Cu, Cr and Mn as a heat source material for absorbing and converting a laser beam to heat, incorporated to a glass matrix comprising at least one glass-forming oxide selected from $SiO_2$, $GeO_2$, $B_2O_3$, $P_2O_5$, $TeO_2$, $Ga_2O_3$, $V_2O_5$, $MoO_3$ and $WO_3$ and at least one member selected from alkali metals, alkaline earth metals, rare earth elements and transition elements, and which is produced by the method as defined in any one of the above (1) to (8) to have a pattern of a single crystal or a group of crystal grains comprising components contained in the glass matrix and not containing the heat source material, formed at the surface and/or inside of the glass.

(10) The optical component according to the above (9), wherein the grain diameters of individual crystal grains of the group of crystal grains are from 5 nm to 500 μm.

EFFECTS OF THE INVENTION

With the optical component of the present invention, glass containing a heat source material is employed, whereby an area around the portion irradiated with the laser beam is locally efficiently heated, whereby crystallization at the irradiated portion will be promoted to form a single crystal or a group of crystal grains composed solely of components constituting the glass matrix and not containing the heat source material. Such a single crystal or a group of crystal grains is excellent in secondary optical non-linear properties and forms a pattern excellent in SHG (second harmonic generation) or electrooptical effects. Further, the irradiation with a laser beam is carried out after forming a light-absorbing layer having an absorption coefficient at a laser emission wavelength of the laser beam increased, whereby the portion irradiated with the laser beam can more efficiently be crystallized, and further, the amount of the transition element to be incorporated can be reduced, control of the position of the light-absorbing layer to be formed can freely be made by the oxidation or reduction treatment, whereby patterning at the inside of glass will be facilitated.

MEANINGS OF SYMBOLS

Figure 1:
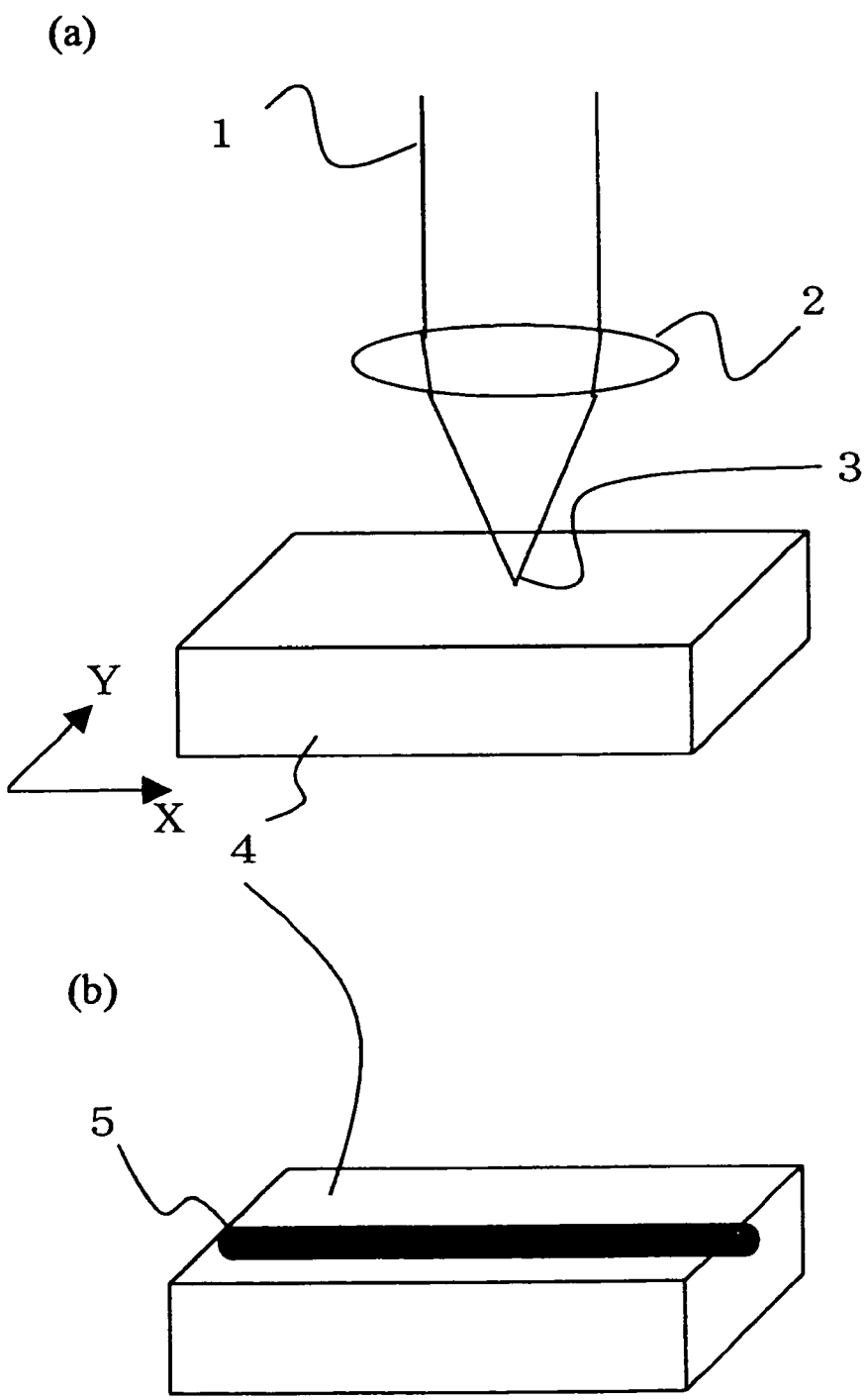
FIG. 1 is (a) a schematic view illustrating a laser irradiation apparatus and (b) a schematic view illustrating a matrix glass after laser irradiation, in a first embodiment.

1: Laser beam
2: Condensing lens
3: Focal point
4: Glass
5: Group of crystal grains formed by laser irradiation
10: Light-absorbing layer

BEST MODE FOR CARRYING OUT THE INVENTION

Now, the present invention will be described in detail.

First Embodiment

An optical component in the first embodiment employs, as a starting material, glass having at least one member selected from Ni, Fe, V and Cu incorporated to a glass matrix comprising at least one glass-forming oxide selected from $SiO_2$, $GeO_2$, $B_2O_3$, $P_2O_5$, $TeO_2$, $Ga_2O_3$, $V_2O_5$, $MoO_3$ and $WO_3$ and at least one member selected from alkali metals, alkaline earth metals, rare earth elements and transition elements. Each glass-forming oxide has an effect to increase a glass forming ability, and alkali metals, alkaline earth metals, transition elements and rare earth elements have a function to increase the optical characteristics. Further, Ni, Fe, V and Cu will function as a medium to absorb a laser beam and convert it to heat i.e. as a heat source material and have an effect to self-organizingly form a single crystal or a group of crystal grains composed solely of components constituting the glass matrix at a temperature in the vicinity of the glass softening point at a portion irradiated with a laser beam. Here, whether the portion irradiated with the laser beam becomes a single crystal or a group of crystal grains depends on the composition of glass and the laser irradiation conditions. The group of crystal grains is meant for one having a plurality of crystal grains gathered or chained.

The above-mentioned combination of the respective components is not particularly limited, and the glass matrix may contain other components which are commonly contained in glass. However, the glass composition is preferably such that the glass transition temperature would be from 250 to 750° C. for such a reason as chemical durability or efficiency in crystallization by laser irradiation. The lower the glass transition temperature, the smaller the amount of the heat source material required. However, if it is lower than 250° C., there may be a problem in chemical durability. On the other hand, as the glass transition temperature becomes high, it will be required to add a larger amount of the heat source material, whereby transparency which is essential as a characteristic of an optical component, tends to be impaired. Accordingly, in the present invention, the upper limit of the glass transition temperature is preferably 750° C.

By irradiating the surface and/or the inside of the glass with a laser beam, a single crystal or a group of crystal grains will be formed at the portion irradiated with the laser beam, and the glass will have secondary optical non-linear properties. Namely, the laser beam applied induces the heat source material present in the glass to excite transition between energy levels corresponding to the laser beam, and the photoexcited electrons undergo relaxation without radiation i.e. emit heat, whereby local heating takes place around such a heat source material. Accordingly, in order to carry out crystallization certainly and sufficiently, the content of such a heat source material is preferably from 0.1 to 3 mol % based on the total amount of the entire components constituting the glass.

FIG. 1 is a schematic view roughly illustrating a laser irradiation apparatus. As shown in FIG. 1(a), a laser beam 1 is condensed by means of a lens 2 to adjust a focal point 3 on a polished surface of glass 4, and the focal point 3 of the laser beam 1 is spatially continuously moved in X-direction or Y-direction or in any desired direction, whereby as shown in FIG. 1(b), it is possible to carry out crystallization linearly or to form a linearly grown group 5 of crystal grains.

With respect to the laser beam 1, its emission wavelength or the type is not particularly limited so long as it is capable of uniformly heating the irradiated portion and it is possible to control the temperature. However, its emission wavelength is preferably in the vicinity of the maximum absorption wavelength of the heat source material, and it is particularly preferred to employ an Nd:YAG laser with a wavelength of 1,064 nm. Further, it is preferred to employ a continuous oscillation laser, whereby the focal point 3 can be spatially moved to form a single crystal or a group 5 of crystal grains linearly. Further, when an Nd:YAG laser with a wavelength of 1,064 nm is used, the irradiation power of the laser beam is preferably from 3 to 100 $W/cm^2$, particularly preferably from 20 to 70 $W/cm^2$. Further, when it is moved linearly, the moving speed of the laser beam 1 is preferably from 0.1 to 400 μm/s, particularly preferably from 1 to 20 μm/s.

Further, in a case where the inside of glass is to be irradiated by the laser beam 1, for example, the lens 2 of the laser irradiation apparatus may be adjusted so that the focal point 3 is adjusted to a desired position (depth) in the inside of glass.

The composition of the single crystal or the group of crystal grains to be formed is determined by the composition of the glass matrix and the type of the heat source material. However, in order to have high secondary optical non-linear properties, it is preferably at least one member selected from groups of crystals made of $Ba_2TiSi_2O_8$ and solid solutions thereof, $Ba_2TiGe_2O_8$ and solid solutions thereof, $BiBO_3$ and solid solutions thereof, $BaB_2O_4$ and solid solutions thereof, $(Sr,Ba)Nb_2O_6$ and solid solutions thereof, $LaBGeO_5$ and solid solutions thereof, $Nd_2(MoO_4)_3$ and solid solutions thereof, $Sm_2(MoO_4)_3$ and solid solutions thereof, $Gd_2(MoO_4)_3$ and solid solutions thereof, $BaTiO_3$ and solid solutions thereof, $LiNbO_3$ and solid solutions thereof, and $KNbO_3$ and solid solutions thereof. Accordingly, it is preferred to select the composition of the glass matrix and the heat source material so that such a group of crystals will be formed.

Further, the individual crystal grains in the group of crystal grains preferably have a particle diameter of from 5 nm to 500 μm. When crystal grains have such a size, they will be excellent in secondary optical non-linear properties. Therefore, the laser irradiation conditions are adjusted so that the crystal grains will have such a size.

Further, preparation of glass as the starting material may be such that to a melt composed of the above-described glass matrix components, FeO, $VO_2$, NiO or CuO as a heat source material is selectively added, followed by solidification into a prescribed shape.

Second Embodiment

An optical component in the second embodiment employs, as a starting material, glass having at least one member selected from V, Fe, Cr, Mn and Cu is incorporated as a heat source material to the same glass matrix as in the first embodiment.

And, in accordance with the following first process or second process, a pattern made of a single crystal or a group of crystal grains will be formed at the surface or the inside of the above glass.

First Process

Figure 2:
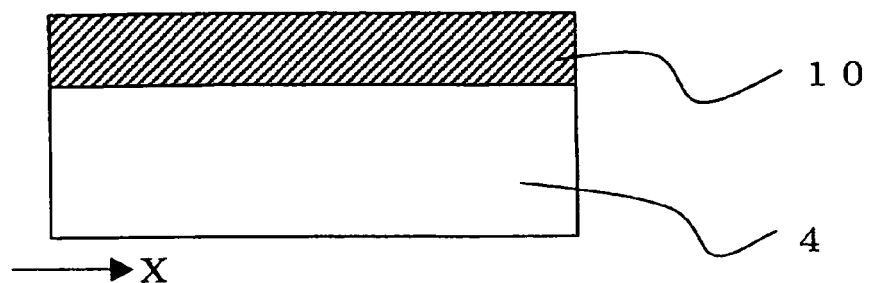
FIG. 2 is a schematic view illustrating a first process relating to a second embodiment.
Figure 2:
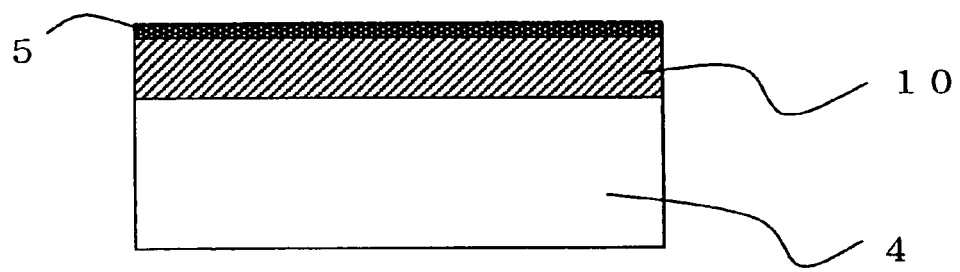
Figure 2:
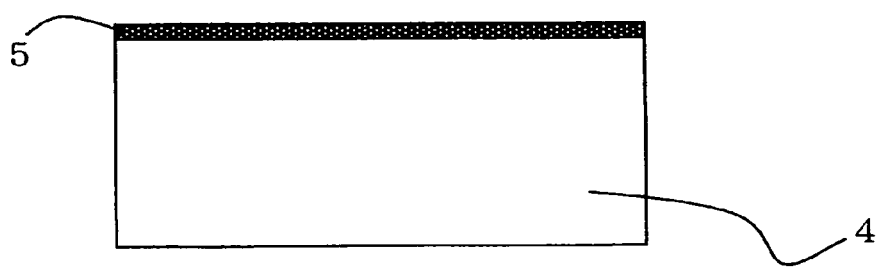

FIG. 2 is a schematic view illustrating the first process. Firstly, the glass is subjected to reduction treatment or oxidation treatment. By the reduction treatment or oxidation treatment, the ionic valency of the heat source element in the glass will be changed, whereby as shown in FIG. 2(a), a light-absorbing layer 10 having an absorption coefficient at an emission wavelength of a laser beam to be applied increased over a prescribed depth from the surface of the glass 4, will be formed. Here, the oxidation treatment may be carried out by heat-treating glass in an oxidizing gas (such as oxygen, ozone, nitrogen dioxide or chlorine dioxide) or in an oxidizing molten salt (such as potassium permanganate or sodium dioxide). Whereas, the reduction treatment may be carried out by heat-treating the glass in a reducing gas (such as hydrogen, ammonia, acetylene or carbon monoxide) or in a reducing molten salt (such as an ammonium salt or a halogenated salt). Further, the type of the oxidizing agent or the reducing agent to be used for the treatment, the conditions such as the gas pressure when a gas is employed, the heating temperature, etc., may suitably be set depending upon the composition of the glass 4. The heating temperature is preferably within a range of the glass transition temperature ±100° C. It is also preferred that prior to the reduction treatment or oxidation treatment, the glass surface to be irradiated with the laser beam, is subjected to optical polishing.

Here, either one of the reduction treatment and the oxidation treatment may be selected for use so long as it is possible to increase the absorption coefficient at the emission wavelength of the laser beam to be applied. For example, in a case where a Nb:YAG laser with a wavelength of 1,064 nm is employed, the laser beam will be converted to heat more efficiently when the ionic valencies of the heat source elements in the glass are $V^{3+}$, $V^{4+}$, $Fe^{2+}$, $Cr^{3+}$, $Cr^{4+}$, $Mn^{4+}$ and $Cu^{2+}$, respectively. Therefore, on the basis of the ionic valencies of the heat source elements in the state incorporated in the glass, either the reduction treatment or the oxidation treatment is selected for use to attain such ionic valencies.

Figure 3:
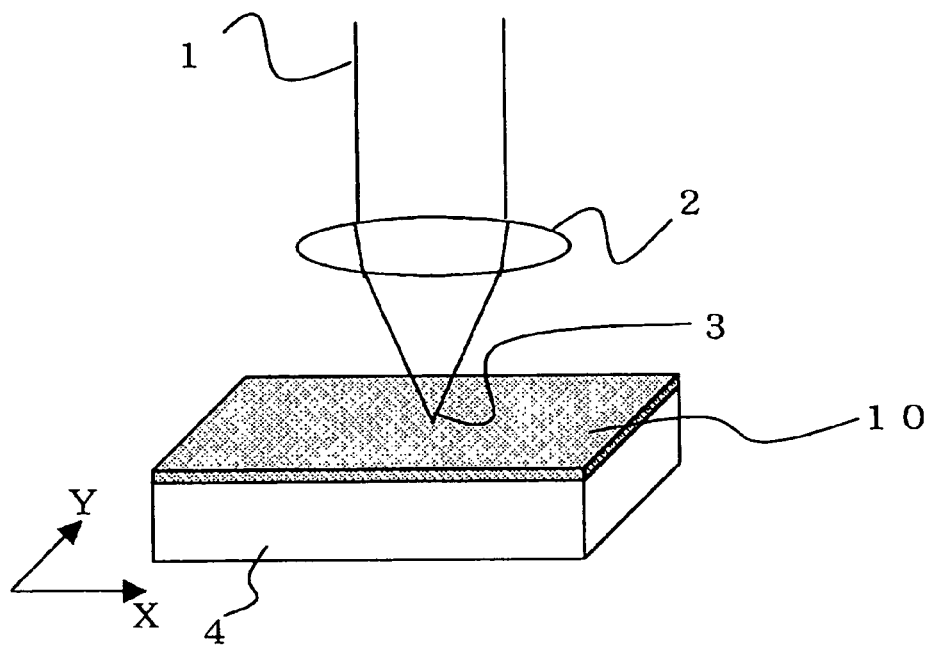
FIG. 3 is (a) a schematic view illustrating a laser irradiation apparatus and (b) a schematic view illustrating glass after laser irradiation in the first process.
Figure 3:
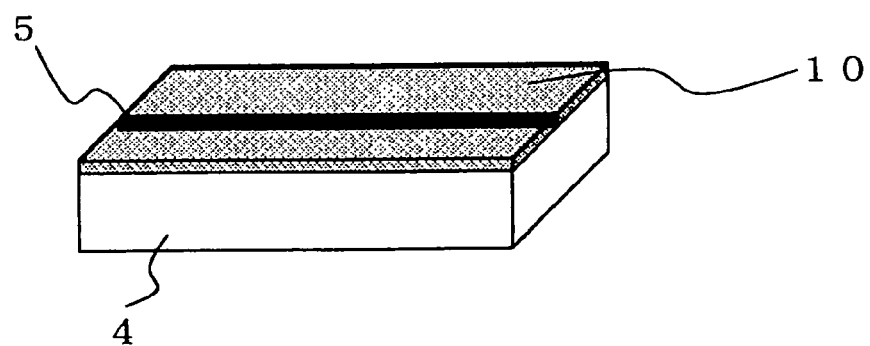

Then, laser irradiation is applied to the light-absorbing layer 10. The laser irradiation may be carried out in the same manner as in the first embodiment. For example, as shown in FIG. 3, a laser beam 1 is focused by a condensing lens 2 on the surface of the light-absorbing layer 10 in the glass 4, and the focal point 3 may be scanned in X-direction or Y-direction in the Fig. or in a desired direction, whereby, as shown in FIG. 3(b) and FIG. 2(b) by the same action as shown in the first embodiment, a single crystal or a group 5 of crystal grains will be formed at the portion irradiated with the laser beam 1, and in the light-absorbing layer 10, the heat source elements have ionic valencies susceptible to photoexcitation, whereby formation of the single crystal or the group 5 of crystal grains will be more accelerated. In order to carry out the crystallization certainly and sufficiently, the content of the heat source elements is preferably from 0.1 to 20 mol %, more preferably from 0.5 to 5 mol %, based on the total amount of the entire components constituting the glass 4.

The composition of the single crystal or the group of crystal grains is determined by the composition of the glass matrix. However, in order to have high secondary optical non-linear properties, it is preferably at least one member selected from groups of crystals made of $Ba_2TiSi_2O_8$ and solid solutions thereof, $Ba_2TiGe_2O_8$ and solid solutions thereof, $BiBO_3$ and solid solutions thereof, $BaB_2O_4$ and solid solutions thereof, $(Sr,Ba)Nb_2O_6$ and solid solutions thereof, $LaBGeO_5$ and solid solutions thereof, $Nd_2(MoO_4)_3$ and solid solutions thereof, $Sm_2(MoO_4)_3$ and solid solutions thereof, $Gd_2(MoO_4)_3$ and solid solutions thereof, $BaTiO_3$ and solid solutions thereof, $LiNbO_3$ and solid solutions thereof, and $KNbO_3$ and solid solutions thereof. Accordingly, it is preferred to select components constituting the glass matrix so that such a group of crystals will be formed.

Further, individual crystal grains in the group of crystal grains preferably have a grain diameter of from 5 nm to 500 μm as in the first embodiment.

In the same manner as in the first embodiment, as the laser beam 1, it is preferred to use an Nd:YAG laser with a wavelength of 1,064 nm, and it is preferred to employ a continuous oscillation laser, whereby it is possible to form a single crystal or a group of crystal grains linearly. The moving speed of the laser beam 1 at that time is preferably from 0.1 to 500 μm/s, more preferably from 0.1 to 250 μm/s, particularly preferably from 1 to 20 μm/s. Further, the laser power is also the same as in first embodiment.

In the illustrated case, the laser beam 1 is applied to the surface of the light-absorbing layer 10. However, the laser beam 1 may be applied to the inside of the light-absorbing layer. In such a case, the focal point 3 may be adjusted to the desired position (depth) in the inside of the light-absorbing layer 10 by adjusting the lens 2.

After completion of the patterning by laser irradiation, the glass 4 may be used as it is, as an optical component. However, the light-absorbing layer 10 remaining around the single crystal or group 5 of crystal grains may deteriorate the optical properties as an optical component. Further, the remaining light-absorbing layer 10 is one formed by oxidation or reduction of glass and yet occupies the majority of the surface and a part of the side surface of the glass 4, whereby it may deteriorate the mechanical strength of the optical component.

Therefore, it is preferred to carry out reduction treatment or oxidation treatment after the patterning to let the remaining light-absorbing layer 10 disappear from the glass 4, as shown in FIG. 2(c). At that time, in a case where the light-absorbing layer 10 was formed by reduction treatment, oxidation treatment is carried out, and in a case where the light-absorbing layer 10 was formed by oxidation treatment, reduction treatment is carried out. Specific methods for the reduction treatment and oxidation treatment may be the same as in the formation of the light-absorbing layer 10, and the treatment conditions are not particularly limited in each case so long as it is possible thereby to let the remaining light-absorbing layer 10 disappear.

In order to confirm formation of the light-absorbing layer 10 in the above process, simply, the end surface may be mirror-polished and observed by an optical microscope, and further, by mapping the reflectance and the fluorescence spectrum, it is possible to detect the distribution (depth) of the light-absorbing layer 10. Further, in the same manner, the disappearance of the light-absorbing layer 10 can be confirmed.

Second Process

Figure 4:
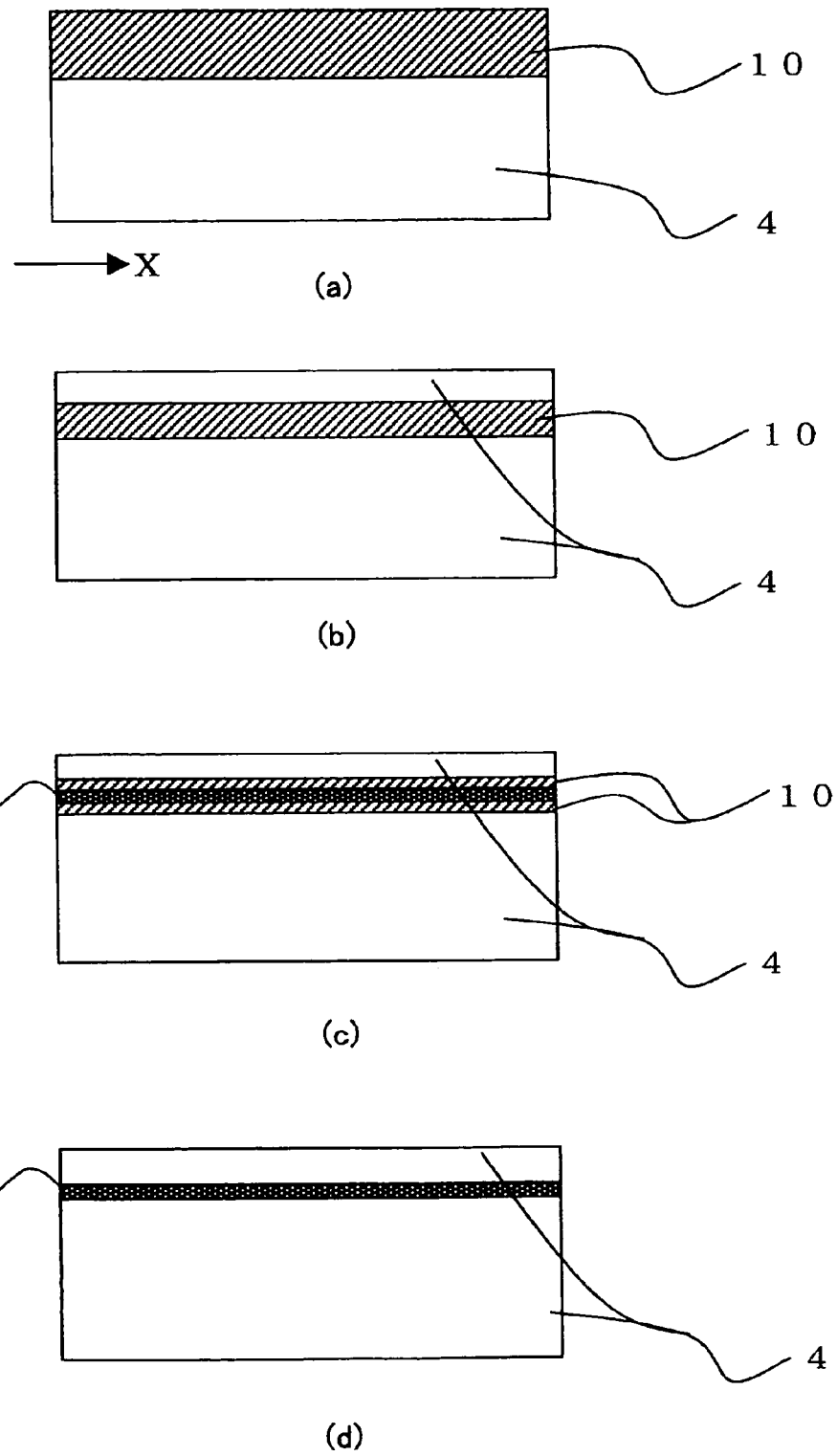
FIG. 4 is a schematic view illustrating a second process relating to the second embodiment.

FIG. 4 is a schematic view for illustrating the second process. Firstly, as shown in FIG. 4(a), glass 4 is subjected to reduction treatment or oxidation treatment in the same manner as in the first process to form a light-absorbing layer 10.

Then, as shown in FIG. 4(b), in a case where the light-absorbing layer 10 is formed by reduction treatment, oxidation treatment is carried out, and in a case where the light-absorbing layer 10 is formed by oxidation treatment, reduction treatment is carried out to let a part of the glass surface side of the light-absorbing layer 10 disappear to a prescribed depth. The reduction treatment or oxidation treatment here can be carried out in the same manner as the reduction treatment or oxidation treatment for forming the light-absorbing layer 10, and the treating conditions are not particularly limited in each case so long as it is possible to let the remaining light-absorbing layer 10 disappear. Thus, a light-absorbing layer 10 is formed at the prescribed depth of the glass 4.

Then, as shown in FIG. 4(c), the light-absorbing layer 10 is irradiated with a laser beam 1 to change the irradiated portion to a single crystal or a group 5 of crystal grains. For the laser irradiation, in the same manner as in the first process, an apparatus as shown in FIG. 3 is employed, and the lens 2 is adjusted so that the focal point 3 is adjusted to the light-absorbing layer 10 and is scanned in X-ray direction, Y-direction or a desired direction.

Thereafter, preferably as shown in FIG. 4(d), the remaining light-absorbing layer 10 is permitted to disappear in the same manner as in the first process.

Thus, in the second process, patterning can be carried out in the inside of glass.

An optical component having a single crystal or a group of crystal grains thus formed on the surface and/or the inside, may, for example, be a component utilizing the secondary optical non-linear properties of the single crystal or crystal grains, such as an optical switch, an optical modulator or an optical isolator. Further, its connection with a glass optical fiber is good.

EXAMPLES

Now, the present invention will be described in further detail with reference to Examples, but it should be understood that the present invention is by no means thereby restricted.

Example 1

Glass comprising 1 mol % of NiO, 33.3 mol % of BaO, 16.7 mol % of $TiO_2$ and 50 mol % of $SiO_2$, was prepared by a melting method and formed into 10 mm×10 mm×1 mm, and further optical polishing was applied to the surface of 10 mm×10 mm as a surface to be irradiated with a laser. Here, the glass transition temperature of the glass was 743° C.

Figure 5:
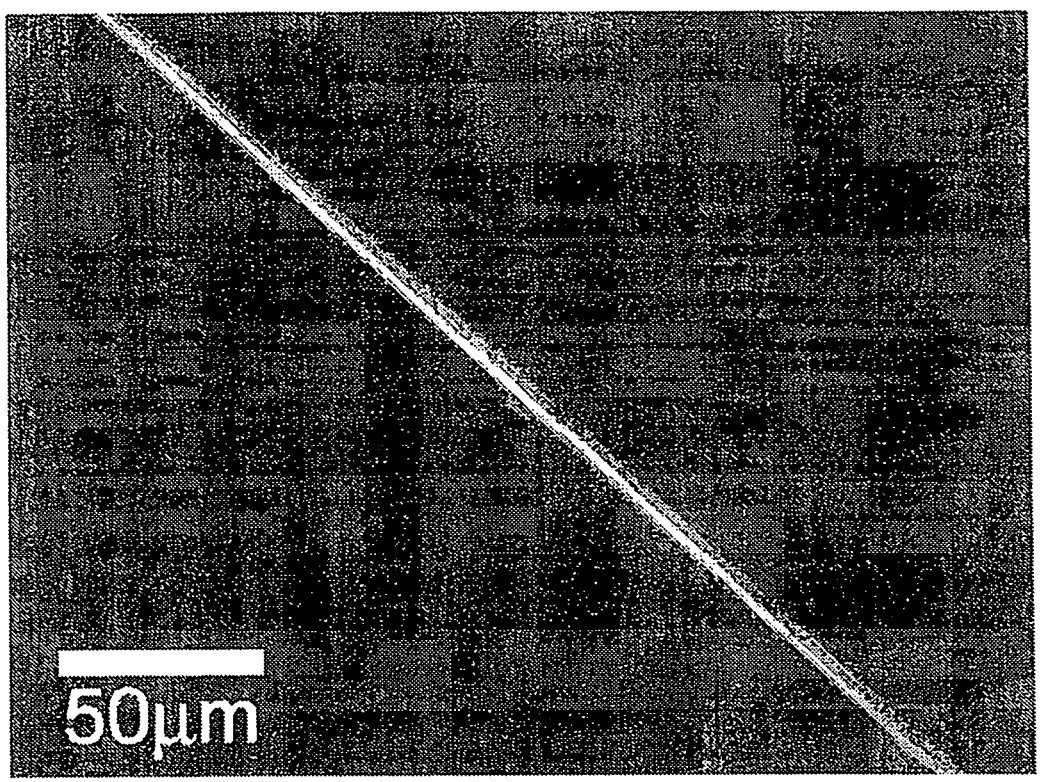
FIG. 5 is a polarization microscopic image of a laser-irradiated portion of glass in Example 1.

Then, using a laser irradiation apparatus shown in FIG. 1(a), light 1 of an Nd:YAG laser (wavelength: 1.06 μm) being CW laser was applied, with its focal point 3 adjusted to the polished surface of the glass 4 by means of the lens 2, so that the position of the focal point 3 of the laser beam was spatially moved continuously at a rate of 7 μm/sec in the X-direction with an irradiation power of 80 W/cm², thereby to prepare a group 5 of crystal grains linearly grown as shown in FIG. 1(b). FIG. 5 shows a transmission polarization microscopic photograph of the laser-irradiated portion of the glass wherein $Ba_2TiSi_2O_8$ crystal grains having grain diameters of from 5 to 1,000 nm were gathered to form a group of crystal grains showing a single line with a width of from 5 to 10 μm. Here, the crystal grains were subjected to compositional analysis by the X-ray diffraction measurement and the microscopic Raman scattering spectrum.

Figure 6:
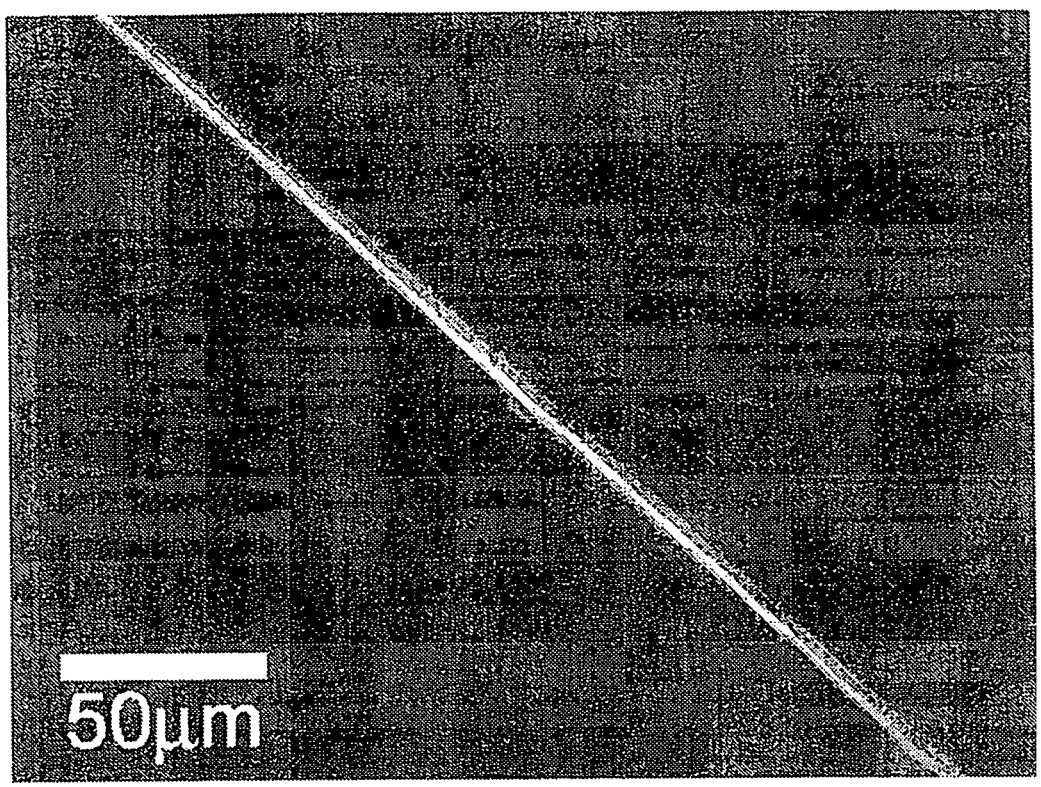
FIG. 6 is a SHG microscopic image of a laser-irradiated portion of glass in Example 1.

Further, in order to confirm the secondary optical non-linear properties, measurement of the second harmonic generation (SHG) was carried out. As a method for measuring the SHG intensity, observation was carried out by a SHG microscope. As the power source, the fundamental wave 1,064 nm of a pulsed YAG laser was applied to a portion where a group 5 of crystal grains was formed, and SHG of 0.532 μm generated by the wavelength conversion was measured. FIG. 6 shows a SHG microscopic image (the same visual field as in FIG. 5). In the SHG microscopic image, it is shown that the SHG intensity is stronger at the brighter portion, and it is evident that along the group 5 of crystal grains, the SHG intensity is high, and the secondary optical non-linear properties are also excellent. Further, it was confirmed that the SHG intensity depends on the polarization state of the fundamental wave.

Example 2

Treatment was carried out in the same manner as in Example 1 except that matrix glass 4 comprising 1 mol % of NiO, 33.3 mol % of BaO, 16.7 mol % of $TiO_2$ and 50 mol % of $GeO_2$ was used, and the irradiation power was 50 W/cm². Like in Example 1, a group 5 of crystal grains comprising $Ba_2TiGe_2O_8$ crystal grains having grain diameters of from 5 to 500 μm was formed. Here, the glass transition temperature of the matrix glass was 670° C.

Example 3

Treatment was carried out in the same manner as in Example 2 except that matrix glass 4 comprising 1.2 mol % of FeO, 33.3 mol % of BaO, 16.7 mol % of $TiO_2$ and 50 mol % of $GeO_2$ was used. Like in Example 1, a group 5 of crystal grains comprising $Ba_2TiGe_2O_8$ crystal grains having grain diameters of from 5 to 500 μm was formed. Here, the glass transition temperature of the matrix glass was 670° C.

Example 4

Treatment was carried out in the same manner as in Example 2 except that matrix glass 4 comprising 1 mol % of CuO, 33.3 mol % of BaO, 16.7 mol % of $TiO_2$ and 50 mol % of $GeO_2$ was used. Like in Example 1, a group 5 of crystal grains comprising $Ba_2TiGe_2O_8$ crystal grains having grain diameters of from 5 to 500 μm was formed. Here, the glass transition temperature of the matrix glass was 670° C.

Example 5

Treatment was carried out in the same manner as in Example 2 except that matrix glass 4 comprising 2 mol % of $VO_2$, 33.3 mol % of BaO, 16.7 mol % of $TiO_2$ and 50 mol % of $GeO_2$ was used. Like in Example 1, a group 5 of crystal grains comprising $Ba_2TiGe_2O_8$ crystal grains having grain diameters of from 5 to 500 μm was formed. Here, the glass transition temperature of the matrix glass was 670° C.

Further, the groups of crystal grains formed in Examples 1 to 5 were analyzed by a laser microscope, X-ray diffraction, microscopic Raman scattering spectrometry and electron beam prove microanalyzer, whereby no solid solution of the added heat source material was detected.

Comparative Example 1

Using matrix glass 4 comprising 0.1 mol % of NiO, 33.3 mol % of BaO, 16.7 mol % of $TiO_2$ and 50 mol % of $GeO_2$, the polished surface was irradiated with a laser for 180 seconds with a laser irradiation power of 80 W/cm² by fixing the laser focal point 3. However, no formation of a group of crystal grains was observed. Further, no SHG was detected.

Comparative Example 2

Using matrix glass 4 comprising 0.1 mol % of $VO_2$, 33.3 mol % of BaO, 16.7 mol % of $TiO_2$ and 50 mol % of $GeO_2$, the polished surface was irradiated with a laser for 180 seconds with a laser irradiation power of 80 W/cm² by fixing the laser focal point 3. However, like in Comparative Example 1, no formation of a group of crystal grains was observed, and no SHG was detected.

Comparative Example 3

Using matrix glass 4 comprising 0.1 mol % of FeO, 33.3 mol % of BaO, 16.7 mol % of $TiO_2$ and 50 mol % of $GeO_2$, the polished surface was irradiated with a laser for 180 seconds with a laser irradiation power of 80 W/cm² by fixing the laser focal point 3. However, like in Comparative Example 1, no formation of a group of crystal grains was observed, and no SHG was detected.

Comparative Example 4

Using matrix glass 4 comprising 1 mol % of $Sm_2O_3$, 33.3 mol % of BaO, 16.7 mol % of $TiO_2$ and 50 mol % of $GeO_2$, the polished surface was irradiated with a laser for 180 seconds with a laser irradiation power of 80 W/cm² by fixing the laser focal point 3. However, like in Comparative Example 1, no formation of a group of crystal grains was observed, and no SHG was detected.

Example 6

Figure 7:
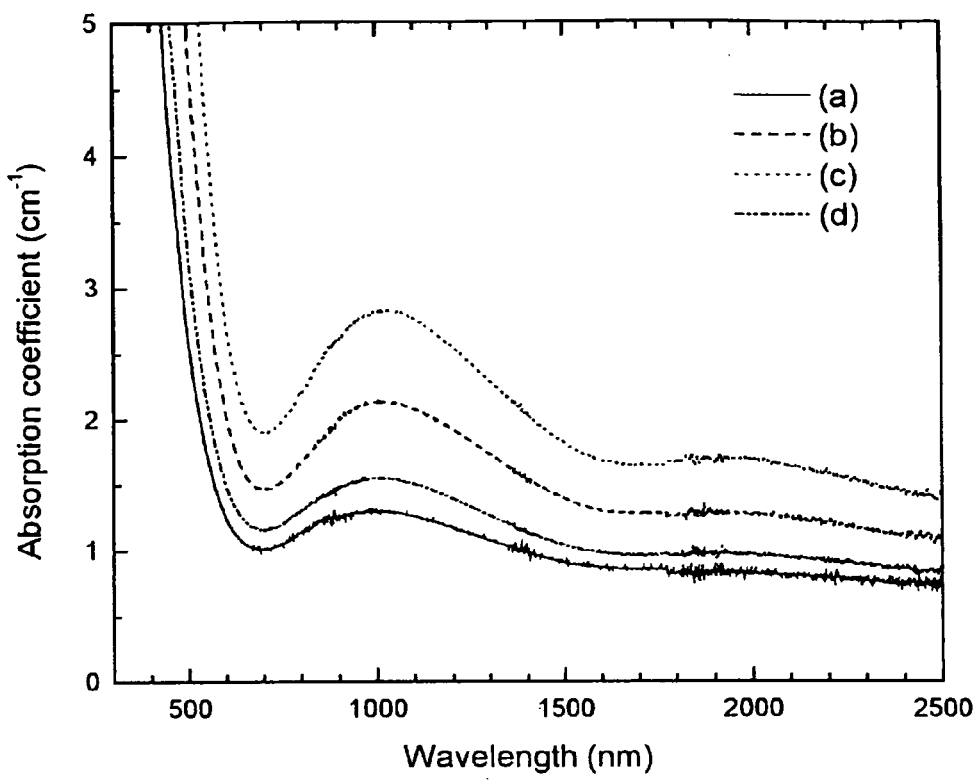
FIG. 7 is graphs showing the results of measurement of light absorption spectra in Examples 1 to 3.
Figure 7:
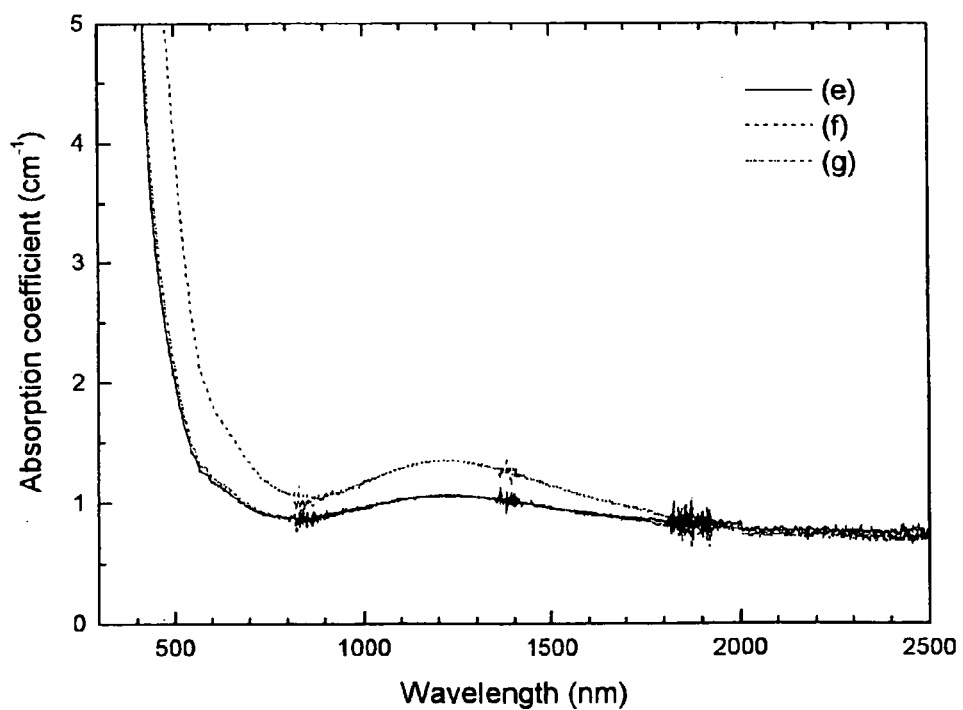

Glass comprising 0.5 mol % of FeO, 33.3 mol % of BaO, 16.7 mol % of $TiO_2$ and 50 mol % of $GeO_2$ was prepared by a melting method and formed into 10 mm×10 mm×1 mm, and then, optical polishing was applied to the surface of 10 mm×10 mm as a surface to be irradiated with a laser. The light absorption spectrum at that time is shown by a curve (a) in FIG. 7. Thereafter, reduction heat treatment was carried out in a 7% $H_2$-93% Ar mixed atmosphere under 1 atm at 675° C. in the vicinity of the glass transition temperature with the laser irradiation surface located above, to form a light-absorbing layer containing a large amount of $Fe^{2+}$ in the vicinity of the surface (FIG. 2(*a*)). Formation of the light-absorbing layer was confirmed by mirror-polishing the end surface and observing it by an optical microscope. The light-absorption spectra when the treating time was 5 hours and 10 hours are shown by a curve (b) and a curve (c) in FIG. 7, respectively. In each case, the absorption coefficient attributable to $Fe^{2+}$ in the vicinity of 1,000 nm was found to be increased than the glass before the treatment (curve (a)), and the longer the reduction treatment, the higher the absorption coefficient became.

Example 7

In accordance with Example 6, reduction heat treatment was carried out for 5 hours in a 7% $H_2$-93% Ar mixed atmosphere under 1 atm at 675° C., and by adjusting the focal point to the surface of 10 mm×10 mm, a continuous oscillation Nd:YAG laser (wavelength: 1.06 μm) was continuously moved at a rate of 5 μm/s spatially in the X-direction with an irradiation power of 80 W/cm² to form a group of crystal grains linearly grown (FIG. 2(*b*)). The compositional analyses were carried out by the X-ray diffraction measurement and microscopic Raman scattering spectrum, whereby formation of $Ba_2TiGe_2O_8$ crystal grains was confirmed.

Example 8

After forming the group of crystal grains in accordance with Example 7, oxidation treatment was carried out for 24 hours at 675° C. in $O_2$ under 1 atm to let the light-absorbing layer disappear (FIG. 2(*c*)). The light absorption spectrum after disappearance of the light-absorbing layer is shown by a curve (d) in FIG. 7, whereby the absorption coefficient was found to be decreased than the case where only the reduction treatment was carried out (curve (b) and curve (c)).

Comparative Example 5

To the glass not subjected to reduction treatment as shown in Example 6 and to the glass having the light-absorbing layer disappeared as shown in Example 8, laser irradiation was applied under the same conditions as in Example 6. However, $Ba_2TiGe_2O_8$ crystal grains were not formed.

Example 9

Reduction treatment was carried out in the same manner as in Example 6 to form a light-absorbing layer in the vicinity of the surface (FIG. 4(*a*)). Then, oxidation treatment was carried out in an $O_2$ gas atmosphere under 1 atm to let the light-absorbing layer on the surface side disappear (FIG. 4(*b*)). Then, laser irradiation was carried out under the same conditions as in Example 6, whereby a group of crystal grains comprising $Ba_2TiGe_2O_8$ crystal grains was formed in the inside of glass.

Example 10

The same operation as in Examples 6 to 8 was carried out except that glass comprising 0.7 mol % of $V_2O_5$, 33.3 mol % of BaO, 16.7 mol % of $TiO_2$ and 50 mol % of $GeO_2$ was used, and the laser beam irradiation power was 90 W/cm², whereby the same results were obtained. Namely, in FIG. 7, the curve (e) represents the light absorption spectrum of the glass prior to the reduction treatment, and the curve (f) represents the light absorption spectrum after the reduction treatment, wherein the absorption coefficients in the vicinity of 500 nm and 1,300 nm attributable to $V^{4+}$ are increased. Further, the curve (g) represents the light absorption spectrum of the glass subjected to oxidation treatment to let the light-absorbing layer disappear, and it is the same as the curve (e) of the glass prior to the reduction treatment, thus indicating that the light-absorbing layer completely disappeared.

Example 11

Figure 8:
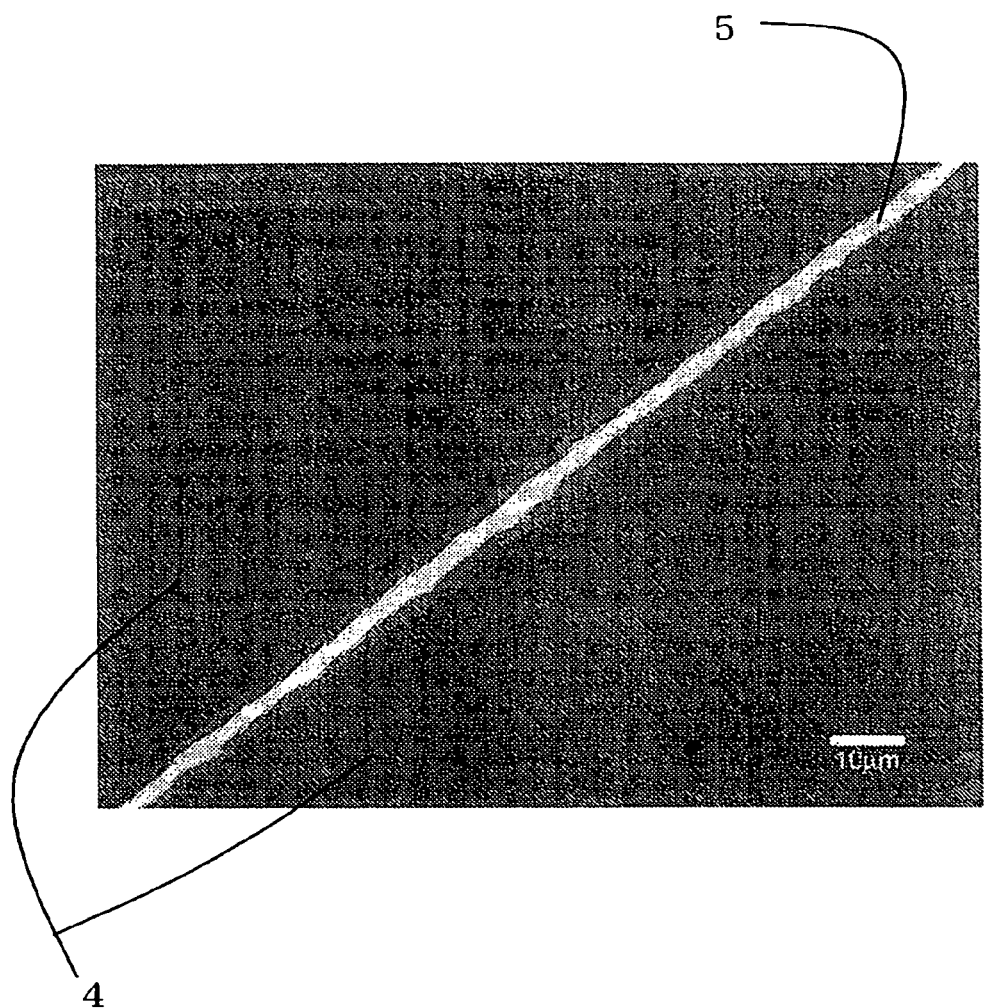
FIG. 8 is a polarization microscopic image in the vicinity of a laser-irradiated portion of glass obtained in Example 2.
Figure 9:
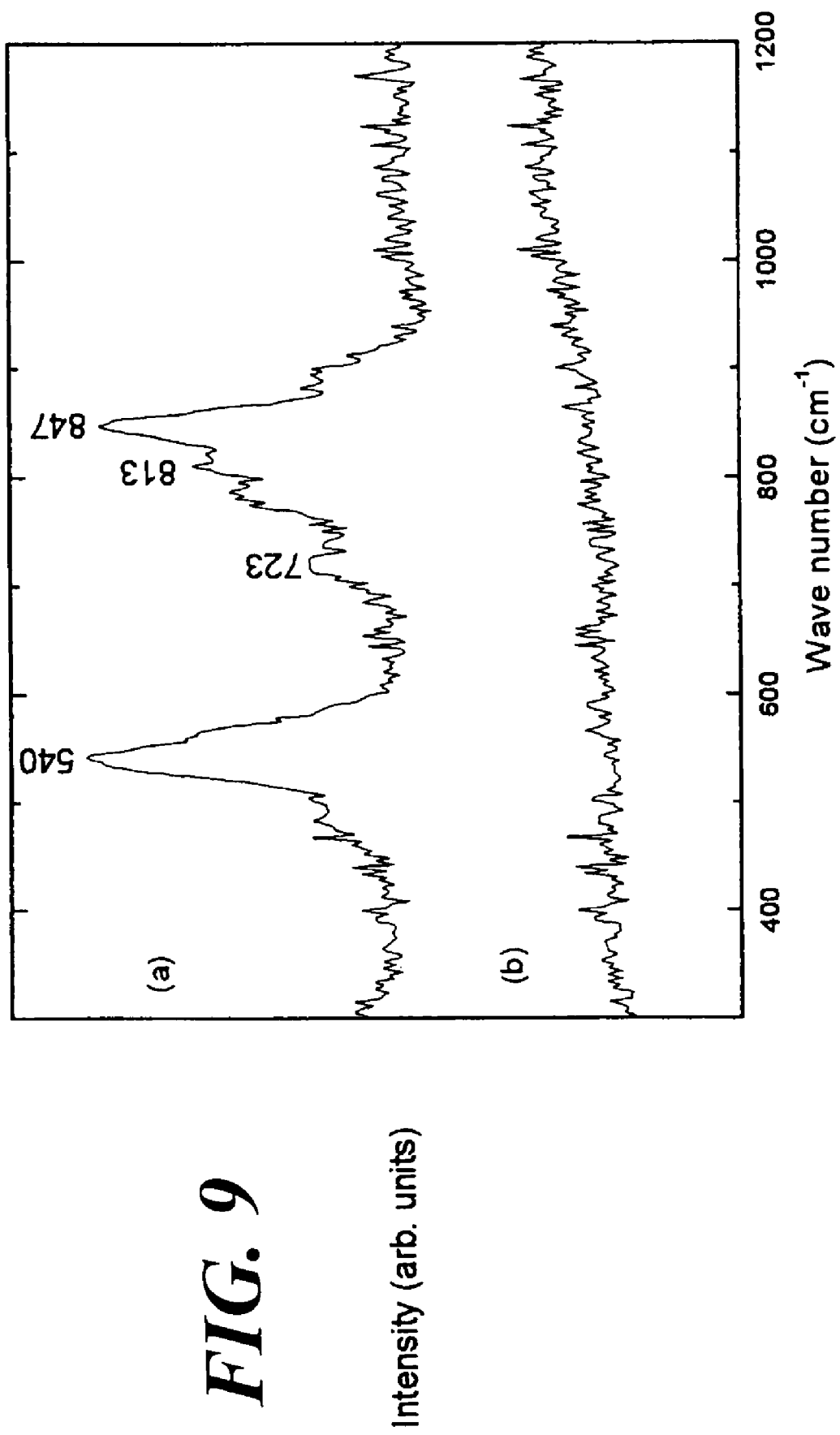
FIG. 9 is a microscopic Raman scattering spectrum in the vicinity of the laser-irradiated portion of the glass obtained in Example 2.

FIG. 8 shows a polarization microscopic photograph of the portion of glass irradiated with a laser, obtained in Example 7, which shows that $Ba_2TiGe_2O_8$ crystal grains having grain diameters of from 5 to 1,000 nm are gathered to form a group of crystal grains showing one line with a width of from 5 to 10 μm (the portion shown by symbol 5). Further, the microscopic Raman scattering spectrum of the portion irradiated with the laser was measured. The results are shown in FIG. 9, whereby peaks specific to $Ba_2TiGe_2O_8$ crystals were confirmed as shown by the curve (a) in the region where the group of crystal grains was formed. On the other hand, in the glass region around it (the portion shown by symbol 4), no spectrum attributable to $Ba_2TiGe_2O_8$ was obtained as shown by the curve (b). Thus, it is apparent that only the region irradiated with the laser was crystallized.

Further, to confirm the secondary optical non-linear properties of the same glass, measurement of the second harmonic generation (SHG) was carried out. As a method for measuring the SHG intensity, observation was carried out by a SHG microscope. As a light source, a fundamental wave 1,064 nm of pulsed YAG laser was applied to the group of crystal grains, and SHG of 0.532 μm generated by the wavelength conversion was measured. At the region where the group of crystal grains was formed, SHG was detected, whereby the group of crystal grains was found to have secondary optical non-linear properties. Further, it was confirmed that the SHG intensity depends on the polarization state of the fundamental wave, and the crystal grains were aligned in the scanning direction of the laser beam.

The entire disclosures of Japanese Patent Application No. 2006-032470 filed on Feb. 9, 2006 and Japanese Patent Application No. 2006-061479 filed on Mar. 7, 2006 including specifications, claims, drawings and summaries are incorporated herein by reference in their entireties.

What is claimed is:

1. A method for producing an optical component, the method comprising:
    oxidizing or reducing a glass comprising at least one heat source material selected from the group consisting of Ni, Fe, V, Cu, Cr, and Mn which absorbs and converts a laser beam to heat, comprised in a glass matrix comprising at least one glass-forming oxide selected from the group consisting of $SiO_2$, $GeO_2$, $B_2O_3$, $P_2O_5$, $TeO_2$, $Ga_2O_3$, $V_2O_5$, $MoO_3$, and $WO_3$ and at least one selected from the group consisting of an alkali metal, an alkaline earth metal, a rare earth element and a transition element, to form a light-absorbing layer having an absorption coefficient at a laser emission wavelength increased over a prescribed depth from a surface;

oxidizing the light-absorbing layer formed by the reducing or reducing the light-absorbing layer formed by the oxidizing, to let the light-absorbing layer partly disappear at a glass surface side region;

irradiating the light-absorbing layer with a laser beam comprising a wavelength to be absorbed by the heat source material at a focal point adjusted to a prescribed depth in the light-absorbing layer, to convert an irradiated portion to a single crystal or a group of crystal grains comprising a component comprised in the glass matrix and not comprising the heat source material, to obtain a pattern.

2. The method of claim 1, further comprising, after the irradiating:

further oxidizing the light-absorbing layer formed by the reducing or further reducing the light-absorbing layer formed by the oxidizing, to let the light-absorbing layer disappear.

3. The method of claim 1, wherein the irradiated portion comprises at least one crystal selected from the group consisting of $Ba_2TiSi_2O_8$, $Ba_2TiGe_2O_8$, $BiBO_3$, $BaB_2O_4$, $(Sr,Ba)Nb_2O_6$, $LaBGeO_5$, $Nd_2(MoO_4)_3$, $Sm_2(MoO_4)_3$, $Gd_2(MoO_4)_3$, $LiBGeO_4$, $BaTiO_3$, $BaLiO_3$, $LiNbO_3$, $KNbO_3$, and solid solutions thereof.

4. The method of claim 1, wherein a Nd:YAG laser is employed for the irradiating.

5. The method of claim 1, wherein the laser beam is continuously moved linearly at a moving speed of from 0.1 to 500 µm/s.

6. The method of claim 1, wherein a single crystal or a group of aligned crystal grains is self-formed.

7. A method for producing an optical component, the method comprising:

oxidizing a glass comprising at least one heat source material selected from the group consisting of Ni, Fe, V, Cu, Cr, and Mn which absorbs and converts a laser beam to heat, comprised in a glass matrix comprising at least one glass-forming oxide selected from the group consisting of $SiO_2$, $GeO_2$, $B_2O_3$, $P_2O_5$, $TeO_2$, $Ga_2O_3$, $V_2O_5$, $MoO_3$, and $WO_3$ and at least one selected from the group consisting of an alkali metal, an alkaline earth metal, a rare earth element and a transition element, to form a light-absorbing layer having an absorption coefficient at a laser emission wavelength increased over a prescribed depth from a surface;

reducing the light-absorbing layer formed by the oxidizing, to let the light-absorbing layer partly disappear at a glass surface side region;

irradiating the light-absorbing layer with a laser beam comprising a wavelength to be absorbed by the heat source material at a focal point adjusted to a prescribed depth in the light-absorbing layer, to convert an irradiated portion to a single crystal or a group of crystal grains comprising a component comprised in the glass matrix and not comprising the heat source material, to obtain a pattern.

8. The method of claim 7, further comprising, after the irradiating:

further reducing the light-absorbing layer formed by the oxidizing, to let the light-absorbing layer disappear.

9. The method of claim 7, wherein the irradiated portion comprises at least one crystal selected from the group of consisting of $Ba_2TiSi_2O_8$, $Ba_2TiGe_2O_8$, $BiBO_3$, $BaB_2O_4$, $(Sr,Ba)Nb_2O_6$, $LaBGeO_5$, $Nd_2(MoO_4)_3$, $Sm_2(MoO_4)_3$, $Gd_2(MoO_4)_3$, $LiBGeO_4$, $BaTiO_3$, $BaLiO_3$, $LiNbO_3$, $KNbO_3$, and solid solutions thereof.

10. The method of claim 7, wherein a Nd:YAG laser is employed for the irradiating.

11. The method of claim 7, wherein the laser beam is continuously moved linearly at a moving speed of from 0.1 to 500 µm/s.

12. The method of claim 7, wherein a single crystal or a group of aligned crystal grains is self-formed.

13. A method for producing an optical component, the method comprising:

reducing a glass comprising at least one heat source material selected from the group consisting of Ni, Fe, V, Cu, Cr, and Mn which absorbs and converts a laser beam to heat, comprised in a glass matrix comprising at least one glass-forming oxide selected from the group consisting of $SiO_2$, $GeO_2$, $B_2O_3$, $P_2O_5$, $TeO_2$, $Ga_2O_3$, $V_2O_5$, $MoO_3$, and $WO_3$ and at least one selected from the group consisting of an alkali metal, an alkaline earth metal, a rare earth element and a transition element, to form a light-absorbing layer having an absorption coefficient at a laser emission wavelength increased over a prescribed depth from a surface;

oxidizing the light-absorbing layer formed by the reducing, to let the light-absorbing layer partly disappear at a glass surface side region;

irradiating the light-absorbing layer with a laser beam comprising a wavelength to be absorbed by the heat source material at a focal point adjusted to a prescribed depth in the light-absorbing layer, to convert an irradiated portion to a single crystal or a group of crystal grains comprising a component comprised in the glass matrix and not comprising the heat source material, to obtain a pattern.

14. The method of claim 13, further comprising, after the irradiating:

further oxidizing the light-absorbing layer formed by the reducing, to let the light-absorbing layer disappear.

15. The method of claim 13, wherein the irradiated portion comprises at least one crystal selected from the group of consisting of $Ba_2TiSi_2O_8$, $Ba_2TiGe_2O_8$, $BiBO_3$, $BaB_2O_4$, $(Sr,Ba)Nb_2O_6$, $LaBGeO_5$, $Nd_2(MoO_4)_3$, $Sm_2(MoO_4)_3$, $Gd_2(MoO_4)_3$, $LiBGeO_4$, $BaTiO_3$, $BaLiO_3$, $LiNbO_3$, $KNbO_3$, and solid solutions thereof.

16. The method of claim 13, wherein a Nd:YAG laser is employed for the irradiating.

17. The method of claim 13, wherein the laser beam is continuously moved linearly at a moving speed of from 0.1 to 500 µm/s.

18. The method of claim 13, wherein a single crystal or a group of aligned crystal grains is self-formed.

* * * * *